Nov. 27, 1951  L. A. TROFIMOV  2,576,156
FLUID TYPE VARIABLE SPEED POWER TRANSMISSION
Filed May 9, 1945  3 Sheets-Sheet 1

INVENTOR.
Lev A. Trofimov
BY Harry R. Canfield
ATTORNEY

Nov. 27, 1951  L. A. TROFIMOV  2,576,156
FLUID TYPE VARIABLE SPEED POWER TRANSMISSION
Filed May 9, 1945  3 Sheets-Sheet 2

INVENTOR.
Lev A. Trofimov
BY Harry R. Canfield
ATTORNEY

Nov. 27, 1951        L. A. TROFIMOV        2,576,156

FLUID TYPE VARIABLE SPEED POWER TRANSMISSION

Filed May 9, 1945        3 Sheets-Sheet 3

INVENTOR.
Lev A. Trofimov
BY Harry P. Canfield
ATTORNEY

Patented Nov. 27, 1951

2,576,156

UNITED STATES PATENT OFFICE 2,576,156

FLUID TYPE VARIABLE-SPEED POWER TRANSMISSION

Lev A. Trofimov, Willoughby, Ohio

Application May 9, 1945, Serial No. 592,746

23 Claims. (Cl. 192—58)

This invention relates to power transmissions of the class which transmit the power of a motor to drive a load at variable speed, from a minimum or zero speed to a maximum speed, and with gradual, stepless changes of speed; or at adjustably constant speed; and either always in the same direction or in forward and reverse directions.

The invention is applicable as a power transmission to many types of loads including hoist, automotive, marine propulsion, winch, steering-gear, and industrial machinery, which are started, accelerated, driven at different speeds or at constant speed, stopped, reversed, and positioned, and it is applicable to transmit the power of any kind of a motor, electric, internal combustion, although the advantages of the invention are more completely developed by utilizing, as the source of power, a motor which runs continuously at its most efficient speed. The invention is also applicable to loads driven in only one direction.

The invention comprises generally speaking a pair or plurality of pairs of elements having parallel spaced apart faces and relatively rotatable (preferably in the form of spaced-apart coaxial discs) and a torque transmitting film of liquid, such as oil, therebetween; and means to maintain the liquid film; one rotatable element driving the other through the film and transmitting torque to it of variable amount as the thickness of the film is varied; and means to apply the torque of a motor to one rotatable element, and communicate the torque from the other to the driven load; and suitable control means actuable to vary the thickness of the film, to vary the transmitted torque, in accordance with desired movements of the load.

It is among the objects of the invention:

To provide, generally, an improved power transmission of the class referred to;

Other objects will be apparent to those skilled in the art to which my invention appertains.

My invention is fully disclosed in the following description taken in connection with the accompanying drawing, in which.

Figures 1, 3, 4:
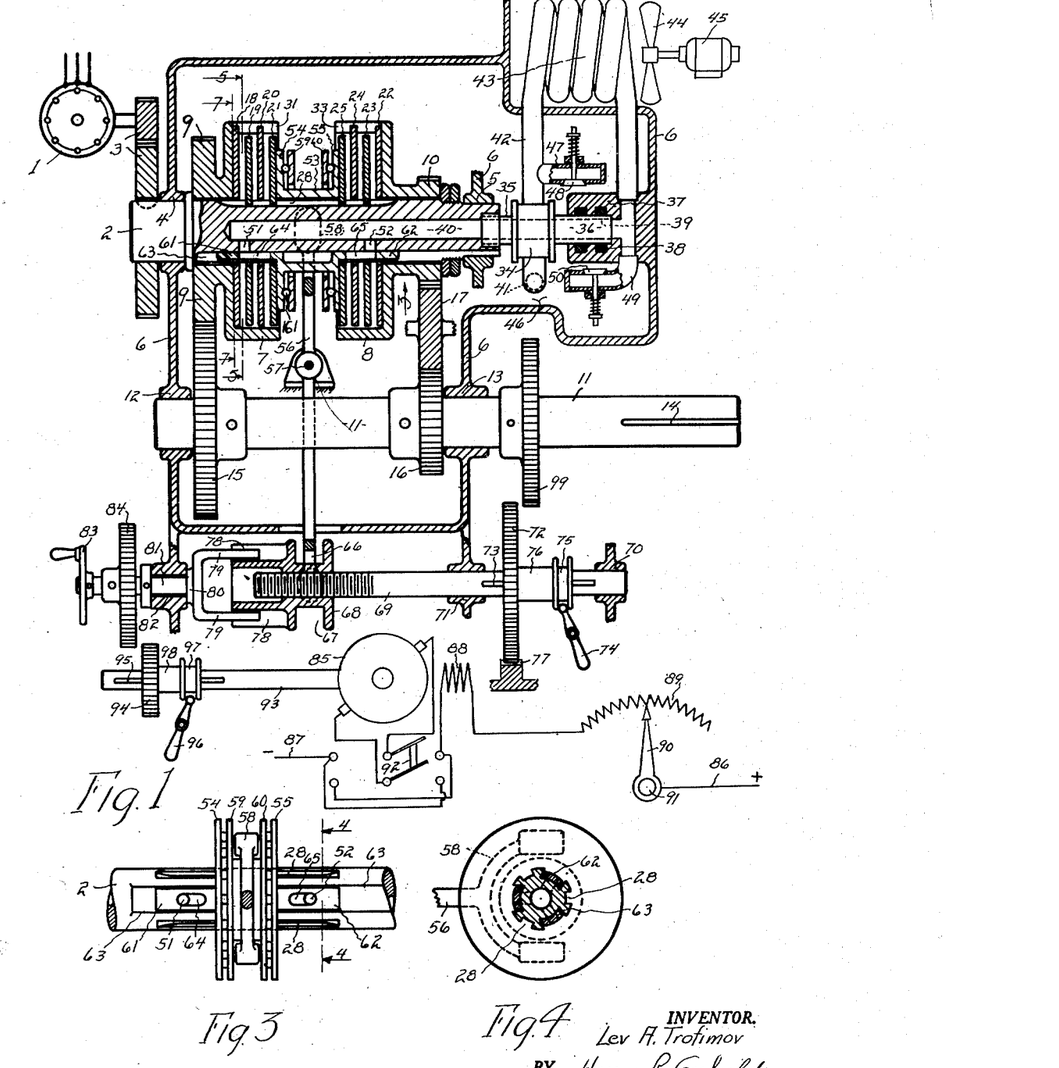
Fig. 1 is a view looking down upon an apparatus embodying the invention, with parts in section and parts broken away for clearness, and showing controls therefor, one of which is an alternative control of electric type illustrated diagrammatically; and certain torque transmitting oil films between certain disc elements of the figure being omitted from the drawing for clearness, but shown in other figures.
Fig. 3 is a view illustrating in elevation a fragment of a shaft shown in longitudinal section in Fig. 1, and the view may be considered as taken generally in the direction of the arrow 3 of Fig. 1.
Fig. 4 is a cross-sectional view taken from the plane 4—4 of Fig. 3.

Referring to the drawing, I have shown at 1, a power supplying motor, which as has been stated may be any kind of a motor, having any suitable speed characteristics or speed control, but which, for purposes of illustration, is shown as a squirrel cage induction motor, and which as is well known runs at substantially constant speed or with a negligible variation of speed within its working torque range. The motor 1 is connected to an input shaft 2, by gearing 3, which gearing may be speed reduction gearing.

The shaft 2 is rotatably supported in bearings 4 and 5 provided in or on a housing or main frame 6.

The shaft 2 rotates coaxially with a pair of rotary elements or disc housings 7 and 8 in the form of cups with their open ends confronting each other; and attached to or integral with the cup 7 is a gear 9; and attached to or integral with the cup 8 is a gear 10. The rotary elements 7 and 8 and their associated gears 9 and 10 may be rotatively supported in any suitable manner but it is convenient to rotatively mount them on the shaft 2 itself as shown.

Parallel with the input shaft 2 is an output shaft 11 rotatably supported in bearings 12 and 13 of the said housing 6, and having a keyway 14 by which it may be connected to a load to be driven. A gear 15 secured to the shaft 11 meshes with the gear 9. A gear 16 secured to the shaft 11 meshes with an idler gear 17, which in turn meshes with the gear 10, the idler gear 17 being rotatively supported in bearings not shown on the housing 6. If preferred, the gears 16 and 10 may be chain sprockets and connected by a chain, in which case the idler 17 may be omitted; and this modification being well understood does not need illustration herein.

After the invention is fully understood it will become apparent that the ratio of the gears 9 and 15 and that of the gears 10 and 16 may be variously chosen, but for convenience of illustration in the drawing they have been made of one-to-one ratio in each case, the gears 10 and 16 being shown smaller than the gears 9 and 15 in order to make provision in the drawing for the idler 17 therebetween.

By reference to Figs. 1, 5, 6, and 7, it will be observed that within the cup 7 is a plurality of discs 18 to 21 inclusive, and within the cup 8 is a plurality of discs 22 to 25 inclusive.

The discs 19, 21, 23, and 25 (see Fig. 5 for the disc 19) have openings 26 at their centers through which the shaft 2 extends and the peripheries of these openings are provided with lugs or keys 27 projecting into axially extending corresponding keyways 28 in the shaft 2. The discs 18, 20, 22, and 24 (see Fig. 7 for the disc 18) have openings 29 surrounding the shaft 2, and at their outer peripheries the discs 18 and 20 have keys or lugs 30 projecting into axially extending corresponding slots or keyways 31 in the side wall of the cup 7, and the discs 22 and 24 have like keys or lugs projecting into slots or keyways 33 in the side wall of the cup 8.

Figure 7:
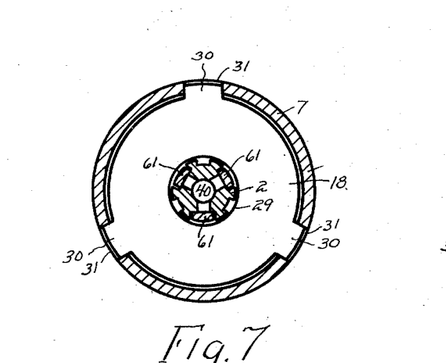
Fig. 7 is a cross-sectional view taken from the plane 7—7 of Fig. 1.
Figure 8:
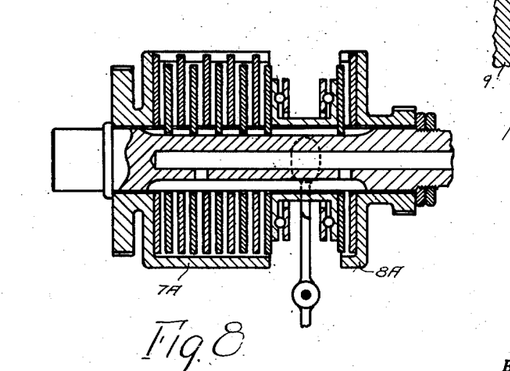
Fig. 8 is a fragmentary view similar to a part of Fig. 1, but illustrating a modification.

From the foregoing it will be seen that in the cup 7 the discs 18 and 20 are constrained to rotate in unison with the gear 9, and cup 7, but are free to move axially in the cup; and that the discs 19 and 21 are constrained to rotate with the shaft 2, but are free to move axially thereon; and that in the cup 8 the discs 22 and 24 are free to move axially but are constrained to rotate with the gear 10 and the discs 23 and 25 are free to move axially but constrained to rotate with the shaft 2. Furthermore, the openings 26 and 29 at the centers of the discs fit the shaft 2 loosely. It follows that the discs have free axial movement and also are free to take up positions at right angles to the shaft 2 and parallel to each other. They are therefore properly described as free floating discs.

A pump 34 preferably of the rotary type is driven by the shaft 2. It may be connected thereto in any suitable manner but preferably is directly connected to it. As shown, the pump has a rotor shaft 35 connected to the end of the shaft 2 for example by having the end of the rotor shaft splined into the end of the input shaft. The rotor shaft 35 extends from the opposite side of the pump as at 36 into a bearing 37 and is sealed therein by packing rings 38. The rotor shaft 35 is hollow, providing therein an oil duct 39, and this duct is aligned with and communicates with an oil duct 40 extending longitudinally in the shaft 2.

The intake conduit of the pump 34 is shown at 41, and the output conduit at 42. The output conduit is connected to the rotor duct 39, through an oil cooling radiator 43 which may be in the form of a conduit coil. A blower 44 driven by a motor 45 may, if wanted, blow upon the coil to increase its oil cooling action. The part of the housing 6 below the pump and below the section plane of Fig. 1 is in the form of a sump 46 containing oil, and when the rotor of the pump 34 rotates, it picks up oil from the sump by the intake conduit 41 and discharges it through the output conduit 42 and through the cooling coil 43 and through the rotor shaft duct 39 to the duct 40 in the shaft 2, the oil returning to the sump in a manner that will appear.

At the output side of the pump is a branch conduit 47 in which is a pressure relief valve 48 which, as an illustrative example, may be set to open at seven pounds per square inch and by-pass oil to the sump 46. At the entrance to the oil duct 39 is a branch conduit 49 in which is a pressure relief valve 50, which in the said illustrative example may be set to open at three pounds per square inch and by-pass oil to the sump.

In a well known manner, the oil in the housing 6 or sump 46 also lubricates the gears above described.

Figure 5:
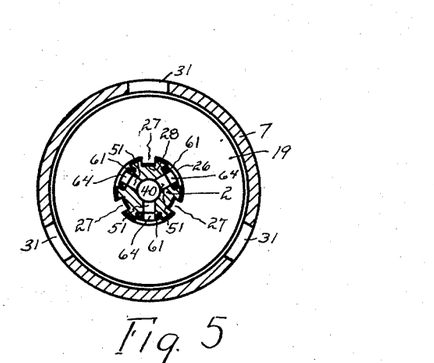
Fig. 5 is a fragmentary sectional view taken from the plane 5—5 of Fig. 1.

The duct 40 in the shaft 2 has two sets of radial branch ducts communicating therewith, three to the set, see Figs. 1, 5, and 7. One set is indicated at 51—51—51 and is associated with the discs in the cup 7 and the other set is similar and associated with the discs in the cup 8, and one of them is shown at 52 in Fig. 1.

In a manner to be more fully described the oil from the pump supplied to the main duct 40 flows out through these branch ducts to the inner peripheries of the discs, and thence flows outwardly to the spaces between each pair of adjacent discs, and finally discharges outwardly through the openings or keyways 31 and 33 in the outer cup walls, whence it returns to the sump for another circulation.

Figure 2:
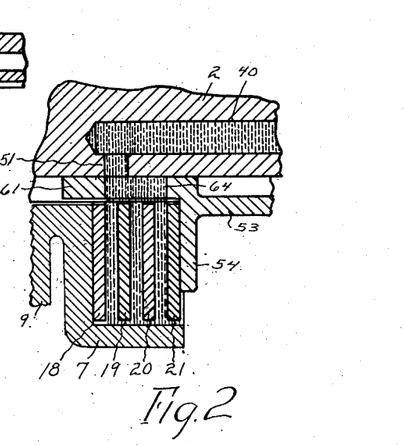
Fig. 2 is a fragmentary view to enlarged scale of a part of Fig. 1 showing some of the oil films omitted for clearness from Fig. 1.

The oil thus provided in the spaces between pairs of adjacent discs is in the nature of a film or films of oil, and because it might obscure the mechanical parts of Fig. 1 the films have been omitted therefrom; but the films are shown to enlarged scale in Fig. 2, from which it will be understood that in Fig. 1 there is between each pair of adjacent discs in both of the cups 7 and 8, a film of oil continuously supplied by the pump 34.

The construction above described provides that the discs 19 and 21 in the cup 7 will be rotated by the shaft 2 and acting through the oil films will transmit torque to the discs 18 and 20 and to the gear 9; and the discs 23 and 25 in the cup 8 will be rotated by the shaft 2 and through the oil films will transmit torque to the discs 22 and 24 and to the gear 10. A few discs only have been shown in each cup 7 and 8 of Figs. 1 and 2 of the drawing; and in some cases such a small plurality will suffice; but in other cases many more may be desirable, and may be provided as will be understood.

As to the transmission of torque from one disc to another through a film of oil therebetween, it has been found that the amount of such torque is determined, not by the friction between the disc and the oil film, but by the internal friction within the film itself; and that this internal friction and therefore the transmitted torque is proportional to three factors, namely: the viscosity of the oil, the amount of slip or relative speed between the two discs; and the thickness of the oil film.

It follows that if the film thickness is the same in both cups (for equal numbers of discs of the same size in both cups) the torque transmitted to the gear 9 will be equal to that transmitted to the gear 10, and these torques, transmitted to the output shaft 11, will be equal and in opposite directions due to the arrangement of the gearing; and the output shaft 11 will then remain at rest whether there is a resisting load torque on it or not.

However, if the film thickness at the discs in one cup, say the cup 7, be decreased with respect to the thickness of the films in the cup 8, (or if concurrently the film thickness in the cup 8 be increased), then the torque transmitted to the gear 9 will be greater than that transmitted to the gear 10, and the output shaft 11 will be caused to rotate in a corresponding direction, and at a speed which increases as the film thickness in the cup 7 is decreased; and means will be described by which this may be accomplished, as a means to control both the speed and direction of rotation of the output shaft 11, and the load driving torque transmitted thereto.

The thickness of the oil films between the discs to transmit torque by friction within the film itself as described, will be of the order of a few thousandths of an inch. I have found that torque can be transmitted efficiently if all of the films in the same cup are of uniform thickness over the whole face or area of the discs; and if the films between all of the discs in the cup are of equal thickness; and that in practice this can be attained by taking advantage of certain facts that I have observed or discovered.

The rotation of the discs causes them to act as centrifugal pumps and to pick up oil supplied to their inner peripheries and propel it outwardly toward their outer peripheries in a spiral path, and the discs themselves thereby continuously develop and maintain their films.

A thin film of oil developed in the space between two adjacent discs tends to become thicker or to expand; and then resists being squeezed to make it thinner; and the thinner it is the more it tends to expand and resist being squeezed and vice versa.

Accordingly when films are produced and maintained in the manner described and with discs that are free floating as described, the discs automatically move and distribute themselves axially to provide equal films in all of the disc spaces in each cup; and also align themselves so that the film on each disc is uniform over its face.

It is therefore not necessary to construct the apparatus so as to accurately align the discs to keep their adjacent faces parallel, which would entail a very expensive construction and difficult accurate machining operations.

For this reason and to attain this desirable result, the oil in the supply ducts in the shaft 2, should be at low pressure, such for example, three pounds per square inch. If too much oil pressure is applied, it tends to break down the thin films and flow in thick streams between the discs and force the discs apart unequally, and this destroys the optimum film conditions described.

The low pressure oil ducts in the shaft 2 therefore function more as a constantly filled reservoir from which the discs pull their oil films, rather than as a pressure supply to force oil into the film spaces between the discs.

When the films in either cup are made thinner to increase the torque transmitted thereby as described, the discs are of course moved closer together, but the movement itself is very small since the films in any case are very thin and it is believed to be a more accurate description to say that pressure applied to the discs, in the direction to reduce the film thickness, squeezes the films and overcomes their tendency to expand and their resistance to being squeezed and thinner films develop accordingly. The control of the film thickness is therefore as much a matter of mechanical pressure applied to the discs as a matter of axial movement thereof.

I have found also that the compression force necessary to squeeze the films thinner is less when the discs pull their film oil from a supply at low pressure as referred to, than when oil under high pressure is supplied in the attempt to force oil out into the film spaces between the discs to provide films; and as will be shown later, I have found this to be an advantage in certain controls for the transmission.

When, in operation, the pressure on the discs in one cup, say the cup 7, is increased to reduce the film thickness, and the pressure on the discs in the other cup 8, is reduced, the tendency of the films in the cup 8 to expand acts, and the discs in the cup 8 are caused to move apart thereby and their films automatically become thicker.

The purpose of the relief valves 48 and 50 will now be apparent. A circulating pump of low pressure type and design would be provided for obvious reasons, and when the circulating oil is cold, as when first starting up at low temperature, the load on the pump 34 and the working parts in it may be excessive. The relief valve 48 is set at a pressure above the normal working pressure, say at seven pounds per square inch, and relieves the pump under these circumstances. The pressure relief valve 50 controls the normal working pressure and maintains it at the desired low pressure which may as an illustrative case be three pounds per square inch. The relief valve 50 in any case will be set to give a pressure sufficient to supply ample oil to the centers of the discs but not sufficient to force oil out between the discs and interfere with the film developing action of the discs described above.

Means will now be described for controlling the thickness of the torque transmitting films.

A spool 53 is disposed between the two cups 7 and 8 and surrounding the shaft 2 and the heads or flanges 54 and 55 thereof abut upon adjacent discs 21 and 25. A lever 56 is provided pivotally supported at an intermediate part thereof on a stationary bearing 57 connected to the frame 6, and at its upper end, as viewed in Fig. 1, has a fork 58 thereon, the ends of the fork being disposed between the heads 54 and 55 of the spool, whereby upon rocking of the lever about its pivot 57, the lever will tend to propel the spool 53 axially with respect to the shaft 2; and to eliminate friction, thrust ball bearings comprising rings 59 and 60, and balls 161 between them and the heads 54 and 55, are provided.

Figure 6:
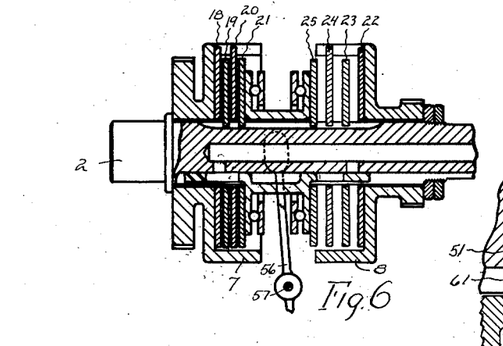
Fig. 6 is a fragmentary view illustrating some of the parts of Fig. 1, but in different operative positions from those shown in Fig. 1.

If, for example, the lever 56 be rocked counterclockwise as viewed in Fig. 1, the discs in the cup 7 will be subjected to greater pressure and those in the cup 8 to lesser pressure; and the films in the cup 7 will be squeezed more and become thinner and those in the cup 8 will expand and become thicker and this condition of the parts is shown in Fig. 6.

As soon as the discs in the cup 7 are compressed to make the oil films therebetween thinner and the films in the cup 8 thicker, the torque transmitted from the shaft 2 to the gear 9 and to the gear 15 begins to be greater than that transmitted from the shaft 2 to the gear 10 and the gear 16; so that the output shaft 11 and a load connected thereto begin to turn, and as will now be clear, as the films in the cup 7 are made still thinner by continuously increased pressure by the lever 56, the shaft 11 and a torque load thereon will be caused to rotate faster.

If the lever 56 be rocked in the clockwise direction, the films in the cup 8 will be the ones which are made thinner and the torque applied to the gear 16 will be greater than that applied to the gear 15 and the shaft 11 will be driven in the other direction.

If the lever 56 is rocked sufficiently far in either direction, the oil films will be completely squeezed out from between the discs of one set and the discs will come into direct physical contact with each other without any oil film therebetween, and the load shaft 11 will then be driven at full speed since then there will be no slip between adjacent discs.

Thus at zero speed of the load shaft, and at load speeds on up to higher speeds and approaching full speed, there is slip between the discs by reason of the torque transmitting oil films; and at full speed no slip; but it is to be observed that at all speeds, the full load torque of the motor 1 may be developed at the output shaft 11. To illustrate, if a load connected to the output shaft 11 be one requiring the maximum full load torque to move it, and assuming that it be desired to move it at low speed, the lever 56 would be rocked continuously until the oil films were thin enough to transmit the full load torque necessary to move the load at that selected speed; and the same is true for loads at higher speeds.

It will be apparent from the drawing and from the above description, that if oil films are supplied to all of the discs in both cups 7 and 8 all of the time, then when one set of discs, say those in the cup 7, are compressed to cause their films to transmit useful torque, some opposing torque representing lost power would be developed in the films of the other set of discs that have become thicker. It is preferable therefore, although not essential, that the oil supply be cut off from the set of discs that are not transmitting useful torque, which in the illustrated case, in going from Fig. 1 to Fig. 6, would be the set of discs in the cup 8; and means is provided and shown in the drawing to accomplish this as follows.

The spool 53 has connected thereto, two sets of valves, three to each set, in the form of fingers extending from the spool in opposite directions axially of the shaft 2, one set of three fingers designated as 61—61—61, Figs. 1, 5, 6, and 7; and the other set extending in the opposite direction designated as 62; and as best shown in Fig. 3 each of the fingers 61 is aligned with one of the fingers 62; and upon reciprocatory movement of the spool the valve fingers reciprocate axially each in a valve groove 63 in the shaft 2.

The valve fingers 61 have each therein a valve port or perforation 64, generally aligned with a corresponding one of the branch passageways 51, and each of the valve fingers 62 has correspondingly therein a port or perforation 65 generally aligned with a corresponding one of the branch passageways 52. These ports or perforations are elongated as shown in Figs. 1, 2, 6, and 3 are so disposed that, for example upon going from Fig. 1 to Fig. 6, as the spool is moved toward the left as viewed in the drawing, the film-supplying oil going through the branch passageways 51 and through the ports 64 continues to flow therethrough and supply film oil, whereas the ports or perforations 65 in the fingers 62 upon the occurrence of such movement begin to cut off the flow through the passageways 52 so that when the parts have arrived at the condition of Fig. 6 the supply of oil is cut off from the discs in the cup 8 while continuing to be supplied to those in the cup 7 for the purposes referred to above.

In the condition of Figs. 1 and 2 the distance between adjacent discs is greater than the thickness that the films will have when transmitting considerable torque. This gives a desirable advantage and may be utilized. A considerable movement of the spool 53 and valve fingers 61 and 62 must take place, to throttle and finally close the branch ducts for example the ducts 52 by the valve fingers 62, and cut off oil supply to one set of discs by the time the other set is under considerable compression. This permits the employment of relatively large branch ducts 51 and 52 as the cut-off ports, and relatively large valve movement for cut-off, which insures more reliable operation with less accuracy in making the parts.

From the foregoing it will be seen that upon rocking the shaft 56 in one direction or the other and through an angle corresponding to the desired results, the output shaft 11 and any torque load connected thereto, will be caused to rotate, and at any desired speed, and from one speed to another without steps, but with continual gradual speed change, up to a top speed, and that at all speeds the full torque of the motor 1 may be developed on the load shaft; and that the load shaft 11 may thus be driven in either direction or brought to rest and held at rest.

Various means may be provided to rock the lever 56. It may be simply rocked by hand in which case a handle would be attached thereto for the purpose; but I prefer to provide a more sensitive or micrometer control and one having additional advantages, and such control is shown in Fig. 1 and will now be described.

The lever 56 is extended downwardly beyond the pivot 57 and has on its lower end as viewed in Fig. 1 a fork 66 disposed in a groove 67 in a travelling nut 68 which is threaded upon a screw 69.

The screw 69 is rotatably mounted in bearings 70 and 71 on the frame 6; and outwardly of the bearing 71 a gear 72 is splined as at 73 to the screw 69, whereby the gear and the screw rotate in unison; but the gear may be shifted axially therealong by a shift lever 74 cooperating in a well known manner with a groove 75 on a hub 76 of the gear. In the shifted position of the gear 72 shown in Fig. 1, and for the present description, the teeth of the gear 72 are meshed with a stationary tooth or teeth 77, stationarily supported upon a part of the frame 6, to prevent rotation of the gear 72 and the screw 69 as will be understood.

The nut 68 has recesses 78—78 extending axially of the screw 69, and into these recesses project the fingers 79—79 of a fork 80 having a shank or shaft 81 extending therefrom and rotatably supported in a bearing 82 on the frame 6; and outwardly of the bearing the shaft 81 has a hand wheel 83 thereon for turning it; and a gear 84 is also connected to the shaft 81 by which it may be rotated in another and alternative manner to be described.

When an operator rotates the hand wheel 83, and thereby the shaft 81 and the fingers 79—79, the latter rotate the nut 68 and cause it to travel along the screw 69 and this movement of the nut as will be apparent will rock the shaft 53 for the purposes described and in one direction or the other depending upon the direction of rotation of the hand wheel 83.

Thus by rotating the hand wheel 83 in one direction or the other the output shaft 11 and the load connected thereto will be driven in a corresponding direction, and at a speed proportional to the extent of rotation of the hand wheel 83, and to bring the load to rest the hand wheel 87 would be rotated back in the other direction, or, to reverse the load would be rotated beyond its original position in the other direction.

Alternative means is also shown in Fig. 1 by which the control of the speed and direction of the shaft 11 may be effected electrically and this is particularly advantageous when remote control thereof is desirable.

At 85 is shown an electric motor energized across supply mains 86 and 87, and having in series therewith a field 88 and a resistor 89. The resistance of the resistor may be adjustably varied by a contact arm 90 movable thereover by a handle 91. A reversing switch for the motor 85 is shown at 92.

The motor shaft 93 has a gear 94 rotatable therewith but splined as at 95 for axial movement therealong, and its position may be shifted by a shift lever 96 working in a groove 97 on a hub 98 of the gear in a well known manner.

Upon rocking the lever 96, the gear 94 will be meshed with the gear 84 whereby the gear 84 and the shaft 81 may be rotated by the motor 85 for the purposes described. The speed of the motor may be changed by operating the handle 91 to change the motor resistance; and the direction of the motor may be changed by operating the reversing switch 92; whereby movements of the shaft 81 may be effected by remote control electrically instead of by the operator's hand wheel 83.

In some cases, the load connected to the output shaft 11 may be of such a type that to move it another type of control is desirable; and since the same is readily applicable to the control apparatus of Fig. 1 above described and is a part of the invention, it has also been shown as a part of Fig. 1.

It will first be assumed that the gears 94 and 84 are disconnected from each other by the shift lever 96 and are in the position of Fig. 1.

The lever 74 is now operated to shift the gear 72 out of engagement with its locking or holding teeth 77 and into mesh with a gear 99 on the load shaft 11.

With this arrangement when the operator turns the hand wheel 83, and propels the nut 68 along the screw 69 to rock the lever 56, the load shaft 11 begins to rotate and, through the agency of the intermeshed gears 99 and 72, turns the screw 69 in the direction which will propel the nut 68 in the return direction were it not for the continued rotation of the hand wheel 83.

In the operation of the apparatus with this arrangement, the operator turns the hand wheel 83 to rotate and propel the nut 68, and the output shaft 11 begins to rotate and rotate the screw 69, and reaches a speed at which the rotation of the screw 69 exactly counteracts rotation of the nut 68; so that the output shaft 11 continues to rotate at that speed. If the hand wheel 83 be rotated at a higher speed, the load shaft 11 comes up to and runs at a correspondingly higher speed. If the operator turns the hand wheel slower, the output shaft 11 slows down to a lower speed and runs at that speed. If the operator stops turning the hand wheel 83, the shaft 11 will rotate the screw 69 and propel the nut 68 and rock the lever 56 to an intermediate position at which the shaft 11 will stop rotating. This type of control is particularly useful with loads that are to be moved and stopped to position them.

By the simple expedient of making the friction between the threads of the screw 69 and the nut 68 greater than that in the bearings 70, 71, and 82, another mode of operation results. After the operator has rotated the hand wheel 83 and the shaft 11 comes up to the speed corresponding to the velocity of the hand wheel, if the operator then lets go of the hand wheel, the gears 99 and 72 will rotate the screw 69 and the nut 68 therewith in unison, and the nut will rotate the hand wheel 83 and the shaft 11 will continue to rotate at that speed. To slow down the load shaft, the operator can momentarily touch the hand wheel 83 to momentarily stop or slow down its rotation, and then let go of it again, and the shaft 11 will rotate at a slower speed; or if he touches the hand wheel 83 and stops it and holds it stopped, the load shaft 11 will slow down and come to rest.

The apparatus of Fig. 1 may also be employed to drive the load shaft 11 continuously at constant speed and to compensate for tendencies of its speed to change due to any cause, for example a change of load. For this purpose, the gears 99 and 72 are engaged by the lever 74, and the gears 84 and 94 are also engaged by the lever 96 and the motor 85 is used.

The motor 85 in this case would be a motor having adjustable constant speed characteristics, such as a universal motor or a single phase, high-rotor-resistance capacitor motor. The motor would be driven in a direction and at a speed corresponding to the direction and speed at which the output shaft 11 is to rotate.

The motor rotates the nut 68 and propels it and rocks the lever 56 until the load shaft 11 starts and accelerates. The load shaft rotates the screw 69. When the load shaft comes up to the desired speed, the lever 56 comes to rest, because the rotations of the nut and of the screw neutralize each other. If now the load shaft 11 should momentarily change its speed, due to any cause and thereby change the speed of rotation of the screw 69, the lever 56 would correspondingly be rocked by the motor to restore the speed of the load shaft.

The arrangement of discs and oil films of Fig. 1 presupposes that the load shaft 11 will drive loads in both directions. In some cases, it may drive a load always in one direction, and in the reverse direction may have a substantially loadless return. In such cases one of the disc cups for example the disc cup 7 may have more discs in it than the reverse drive cup 8, and this is shown in Fig. 8 where the cups are identified as 7A and 8A. Fig. 8 also indicates that a great number of discs and films may be utilized in any case instead of only a few as in Fig. 1.

For overhauling loads, for example, descending hoist loads, the control is operated to supply the right amount of torque to the load in the hoisting direction, insufficient to hoist but to allow the load to descend, and its descending speed can be controlled by varying this torque, and the load can be gradually stopped and brought to rest at any point in its descent.

The arrangement of Fig. 8 is suitable for these purposes, and a few discs in the cup 8A may be provided for driving the hoist in the lowering direction when the load is too small to overhaul, for example, an "empty-hook" load. In such cases, the valves described for Fig. 1 may be dispensed with and accordingly have been omitted from Fig. 8.

In cases in which the load shaft 11 is always driven in one direction at variable speed and no provision need be made to stop it, then only one set of discs, for example those in the cup 7 of Fig. 1 or in the cup 7A of Fig. 8 need be provided, and it is believed that in view of the foregoing description this will be so clearly understood as not to need illustration or description herein, although it is to be understood that this invention comprehends this type of drive and the apparatus for effecting it.

As above described, the discs will pick up oil at their central openings and develop uniform, equalized films; and will maintain them when subjected to more or less squeezing pressure to render them more or less torque-transmitting, when the discs are simply free-floating planar faced discs.

Figure 9:
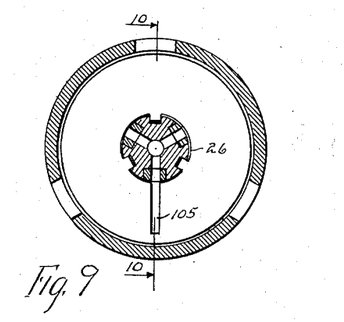
Fig. 9 is a fragmentary view similar to Fig. 5 but illustrating a modification.
Figure 10:
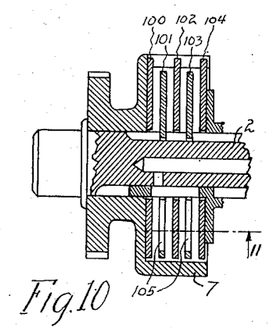
Fig. 10 is a fragmentary view similar to a part of Fig. 1 but illustrating the modification of Fig. 9, and the view may be considered also as taken from the plane 10—10 of Fig. 9.
Figure 11:
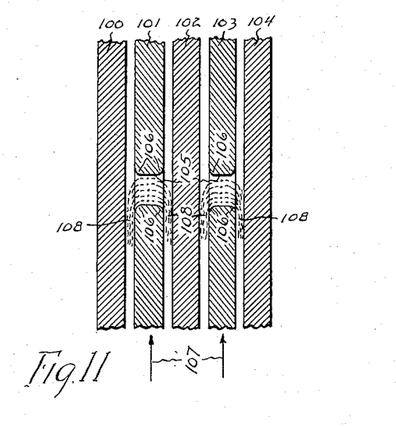
Fig. 11 is a view somewhat diagrammatic in type illustrating certain principles of the operation of the modification of Figs. 9 and 10.

However, in some cases it may be desirable to assist the centrifugal film-forming pumping action of the discs above described by introducing oil between their adjacent faces at points radially outward beyond their central openings and a satisfactory way to do this has been found as follows, utilizing some of the underlying principles of oil lubricated bearings in which a journal runs on a film of oil. Reference may here be had to Figs. 9, 10, and 11.

In Fig. 10 is shown an odd number of discs 100, 101, 102, 103, and 104 and these may be the discs in the cup 7 above described. The alternate discs 101 and 103 have slots 105 therein, see also Fig. 9, extending from the central opening 26 out toward the outer periphery. The slotted discs are preferably the ones driven by the shaft 2, as indicated. Upon rotation of the slotted discs, oil supplied to their central portions as described is pumped outwardly by centrifugal force in the slots. These slots may be of ample width, for example one-eighth inch wide and therefore oil flows outwardly unrestrictedly therein. The slots thus constantly filled with oil are, in effect, extensions of the oil supply ducts in the shaft 2. The slots being open at the side, toward the oil film space, the open side constitutes an outlet orifice, through which oil is supplied from the duct to the film.

As shown in Fig. 11, the edges of the slots 105, as at 106—106, that is, at the outlet orifice, are distinctly rounded.

It is well known that a cylindrical shaft or journal rotating in a cylindrical bearing with clearance for oil lubrication, feeds or forces or wedges oil between the journal and bearing surfaces when the journal rotates and this lifts the weight of the journal and causes it to float on an oil film. By a similar action, see Fig. 11, the oil supplied to the slot 105 and as it leaves the slot through the said orifice is acted upon by the rounded edges 106 of the slot, and thereby is forced or wedged into the space between the slotted discs 101 and 103 and unslotted discs 100, 102, and 104, as indicated at 108 upon rotary movement of the slotted discs relative to the unslotted disc, indicated by the arrow 107 in Fig. 11. A similar action occurs in the reverse direction of rotation of the discs 101 and 103. Obviously the oil thus wedged into the film space is under axially directed pressure.

Films of oil are thereby forced to develop in the spaces between the adjacent discs, and under axial pressure therein, over the whole radial extent of the duct.

When these slots 105 are not provided, it is obvious that there is a limit to the diameter of the discs which may be employed, because in that case the oil film at radially outer portions of the discs needs more oil because of the greater area; but is supplied through the radially inner portions of the very thin oil films of small area; and the flow to the outer portions is thereby throttled; but when the slots 105 are provided as described, the oil goes directly and unrestrictedly and unthrottled to all parts of the disc including the radially outer parts to form the films thereat.

The said slots 105 may be straight radial slots as shown in Fig. 9; or they may be curved; or they may extend tangentially; or at an angle to circular directions of rotation of the disc. And while only one slot is shown for simplification in the drawing, a plurality may be provided spaced angularly around the disc axis; all of which will now be so well understood as not to need further illustration or description.

Figure 12:
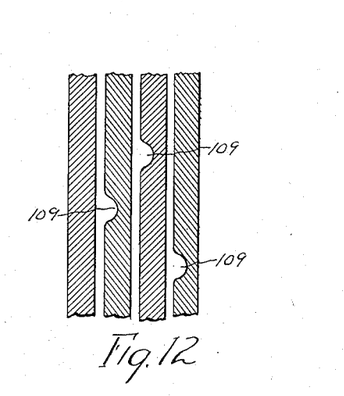
Figs. 12 and 13 are views similar to Fig. 11 but illustrating in principle other modifications corresponding to that of Figs. 9 and 10.
Figure 13:
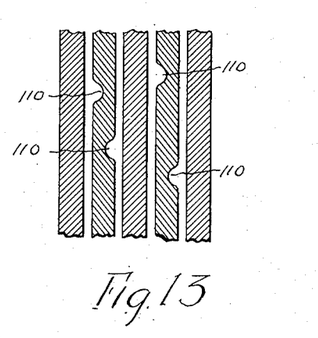

As a modification, see Fig. 12, radial grooves 109 rounded at their edges as shown, may be provided in the faces of the discs instead of slots through the discs as at 105, to perform the above described functions of the slots 105. Fig. 12 will be understood from the above description of Fig. 11. Oil flows freely from the central portions of the discs outwardly radially through the grooves 109 and all along the grooves develops torque transmitting films under axial pressure between adjacent disc faces. All of the grooved discs, with this modification may be identical if desired or they may be of two kinds as shown in Fig. 13 each having grooves 110 in both faces as will be understood. When a plurality of radial grooves are provided in the faces of a disc, the face is in effect a radially "corrugated" disc face.

From the foregoing, it will now be apparent that my invention may be embodied in different constructions and that the illustrative embodiment of Fig. 1 may be variously modified; and my invention is comprehensive of all changes and modifications of the form shown and described above, which come within the scope of the appended claims.

I claim:

1. A power transmission for driving a load with variable, stepless, speed changes, comprising: a power input element for connection to a power source; a power output element for connection to a load to be driven; two torque transmitters between the input and output shafts, for respectively transmitting torques to the output shaft in opposite directions simultaneously; each torque transmitter comprising a pair of relatively rotatable elements having parallel coaxial surfaces closely adjacent but spaced apart; means to continuously supply and maintain torque transmitting liquid films therebetween; means operable by relative rotation of the elements developing axially directed pressure in the films tending to move the pairs of elements apart; and operable means to variably change the relative thickness of the liquid films to cause one transmitter to variably transmit more torque than the other, comprising means to force one pair of elements closer together against the said axially directed film pressure.

2. A power transmission for driving a load with variable, stepless, speed changes, comprising: a power input element for connection to a power source; a power output element for connection to a load to be driven; two torque transmitters between the input and output shafts, for respectively transmitting torques to the output shaft in opposite directions simultaneously; each torque transmitter comprising a pair of relatively rotatable elements having parallel surfaces closely adjacent but spaced apart; and means to continuously supply and maintain torque transmitting liquid films therebetween; means operable by relative rotation of the elements developing axially directed pressure in the films tending to move the pairs of elements apart; and operable means to variably change the relative thickness of the two films to cause one transmitter to variably transmit more torque than the other, to variably drive the output element in one direction or the other or to cause them to transmit equal torques to cause the output element to be at rest comprising means to variably force one pair of elements or the other closer together against the said axially directed pressure thereof.

3. In a power transmission for transmitting variable torque to a load, a rotary power input shaft, a rotary element, the shaft and rotary element being supported to be rotatable relatively, a pair of torque transmitting elements having each a planar face associated therewith and constrained to rotate in unison respectively with the shaft, and with the rotary element, and the faces being disposed in confronting parallel spaced relation and being relatively movable axially; means to supply a flow of oil to central portions of the space between the faces and to flow outwardly radially therethrough and to maintain an oil film between the faces for transmitting torque from the shaft to the rotary element; operable means to effect micrometer movement of the faces relatively axially to vary the distance between them to vary the thickness of the oil film to vary the oil-film-transmitted torque; comprising an operably rotatable screw and a travelling nut thereon and a connection between the nut and one of the torque transmitting elements to move its associated planar face closer to that of the other torque transmitting element; and means to transmit the variable oil-film-transmitted torque from the rotary element to a load to drive it.

4. In a power transmission for transmitting variable torque to a load to drive it in forward and reverse directions and bring it to rest, a rotary power input shaft, a first and a second rotary element, the shaft and the two rotary elements being supported to be rotatable relative to each other; a first pair of torque transmitting relatively axially movable elements having a pair of spaced mutually confronting parallel planar faces associated therewith respectively and constrained to rotate in unison respectively with the shaft and with the first rotary element; a second pair of torque transmitting relatively axially movable elements having a pair of spaced mutually confronting parallel planar faces associated therewith respectively and constrained to rotate in unison respectively with the shaft and with the second rotary element; means to supply a flow of oil to central portions of the two spaces between the pairs of confronting faces and to flow outwardly thereover and to maintain oil films in the spaces between the faces for transmitting torque between the shaft and the rotary elements; operable means to effect axial relative movement of the pairs of faces to vary the oil film thickness in one said space with respect to that in the other, to correspondingly vary the oil-film-transmitted torque at one space with respect to that at the other space, means to transmit oil-film-transmitted torque from the said rotary elements to a load to drive it in forward and reverse direction and bring it to rest.

5. In a power transmission for transmitting variable torque to a load to drive it in forward and reverse directions and bring it to rest, a rotary power input shaft, a first and a second rotary element, the shaft and the two rotary elements being supported to be rotatable relative to each other; a first pair of torque transmitting relatively axially movable elements having a pair of spaced mutually confronting parallel planar faces associated therewith respectively and constrained to rotate in unison respectively with the shaft and with the first rotary element; a second pair of torque transmitting relatively axially movable elements having a pair of spaced mutually confronting parallel planar faces associated therewith respectively and constrained to rotate in unison respectively with the shaft and with the second rotary element; means to supply a flow of oil to central portions of the two spaces between the pairs of confronting faces and to flow outwardly thereover and to maintain oil films in the spaces between the faces for transmitting torque between the shaft and the rotary elements; operable means to effect axial relative movement of the pairs of faces to vary the oil film thickness in one said space with respect to that in the other, to correspondingly vary the oil-film-transmitted torque at one space with respect to that at the other space, means to transmit oil-film-transmitted torque from the said rotary elements to a load to drive it in forward and reverse direction and bring it to rest; and valve means controlled by the operable means to reduce the flow of oil to the space between one pair of faces concurrently with decrease of the oil film thickness between the other pair.

6. In a power transmission for transmitting variable torque to a load to drive it in forward and reverse directions and bring it to rest, a rotary power input shaft, a first and a second rotary element, the shaft and the two rotary elements being supported to be rotatable relative to each other; a first pair of torque transmitting relatively axially movable elements having a pair of spaced mutually confronting parallel planar faces associated therewith respectively and constrained to rotate in unison respectively with the shaft and with the first rotary element; a second pair of torque transmitting relatively axially movable elements having a pair of spaced mutually confronting parallel planar faces associated therewith respectively and constrained to rotate in unison respectively with the shaft and with the second rotary element; means to supply a flow of oil to central portions of the two spaces between the pairs of confronting faces and to flow outwardly thereover and to maintain oil films in the spaces between the faces for transmitting torque between the shaft and the rotary elements; operable means to effect axial relative movement of the pairs of faces to vary the oil film thickness in one said space with respect to that in the other, to correspondingly vary the oil-film-transmitted torque at one space with respect to that at the other space; means to transmit oil-film-transmitted torque from the said rotary elements to a load to drive it in forward and reverse direction and bring it to rest; and valve means controlled by the operable means to cut off the flow of oil to the space between one pair of faces concurrently with decrease of the oil film thickness between the other pair to a preselected thickness.

7. The transmission described in claim 4 and in which the operable means is optionally operable to move one or the other pair of faces until they are in direct frictional contact with each other.

8. In a power transmission, a rotary power input shaft, a pair of rotary elements surrounding the shaft, and spaced axially therealong; two pairs of discs surrounding the shaft and one pair spaced from the other along the shaft; the discs of one pair being connected respectively with the shaft and with one rotary element for rotation in unison with them and axial movement on them respectively; the discs of the other pair being connected respectively with the shaft and with the other rotary element for rotation in unison with them and axial movement on them respectively; each pair of discs having parallel, spaced-apart, planar, mutually confronting faces; a main oil duct in the shaft; pump means to supply a flow of oil to the main duct; a pair of branch ducts leading from the main duct to the spaces between the pairs of disc faces, to supply oil to central portions of the faces and to flow outwardly radially thereover and maintain an oil torque transmitting film in the space therebetween; operable control means to variably move the discs of one pair closer together to decrease the film thickness in the space therebetween relative to that between the other pair, to cause the films to transmit greater torque from the shaft to one rotary element than from the shaft to the other rotary element; a rotary output shaft; means to transmit film-transmitted torque from one rotary element to the output shaft in the forward direction and from the other rotary element to the output shaft in the reverse direction.

9. The transmission described in claim 8 and in which the operable control means comprises: a pivoted lever one end of which is disposed between the shaft connected discs, and when rocked in alternate directions moves one or the other axially; and the other end of which lever is connected to a travelling nut on a rotary screw; and means is provided to alternately rotate the screw to rock the lever with micrometer movements in alternate directions.

10. The transmission described in claim 8 and in which the operable control means comprises: a pivoted lever one end of which is disposed between the shaft connected discs, and when rocked in alternate directions moves one or the other axially; and the other end of which lever is connected to a travelling nut on a rotary screw; and means is provided to alternately rotate the screw to rock the lever with micrometer movements in alternate directions; and in which means is provided to rotate the screw by rotary movement of the output shaft to tend to restore the lever to an intermediate position at which the two said torques of the two rotary elements, transmitted to the output shaft in the forward and reverse directions, are equal.

11. In a power transmission for driving a rotary load and maintaining its speed constant, two pairs of relatively rotary elements; the elements of each pair having mutually confronting spaced-apart parallel faces and being movable relatively to vary the thickness of the space between them; a power input for driving one of the rotary elements of each pair; means to supply liquid to the spaces between the pairs of parallel faces to maintain liquid films in said spaces of torque transmitting thickness; a rotary power output shaft connected to the other elements of the said pairs, and receiving film transmitted driving torque from one pair to drive the output shaft in the forward direction and from the other pair to drive it in the reverse direction; a movable actuating element movable in alternate directions and associated with the pairs of elements to move them relatively, to alternately decrease the film thickness in the space between one pair of elements to increase the torque transmitted thereby relative to that transmitted by the other pair; a constant speed motor connected to the actuating element for moving it at a constant rate in one direction; and a connection from the output shaft for moving the actuating element in the other direction at a rate proportional to its speed.

12. A power transmission comprising a pair of relatively rotatable and axially relatively movable elements each having an annular face surrounding a central opening at its rotational axis, the faces being mutually confronting and parallel and with a film pace therebetween; a rotary power input to one of the elements to rotatively drive it; a rotary power output from the other element; a torque transmitting film of liquid in the film space between the two faces to transmit torque from the driven element to the other element; means to continuously maintain the film during relative rotation of the elements comprising a duct extending generally radially of a rotatable element and opening into the film space, and means to supply liquid to the central opening and to the duct and to the film space at radially intermediate portions thereof; and means to subject the liquid of the film to axially directed pressure at the said radially intermediate portions tending to move the said portions apart axially, comprising wedging surfaces at the duct opening wedgingly forcing the liquid into the film space during relative rotation of the rotatable elements.

13. A power transmission comprising a pair of relatively rotatable and axially relatively movable elements each having a face surrounding its rotational axis, the faces being mutually confronting and parallel with a film space therebetween; a rotary power input to one of the elements to rotatively drive it; a rotary power output from the other element; a torque transmitting film of liquid in the film space between the two faces to transmit torque from the driven element to the other element; means to continuously maintain the film during relative rotation of the elements comprising a generally radial duct in one of the rotary elements open along its side toward the other element, means to supply liquid directly to a radially inner end of the duct and through the open side of the duct to radially intermediate portions of the faces; and means to subject the liquid of the film to axially directed pressure at the said radially intermediate portions, tending to move the said portions apart axially, comprising inclined surfaces at the opening of the duct formed to wedgingly force the liquid into the film space.

14. A power transmission comprising a pair of relatively rotatable and axially relatively movable elements each having an annular face surrounding a central opening at its rotational axis, the faces being mutually confronting and parallel with a film space therebetween; a rotary power input to one element to rotatively drive it; a rotary power output from the other element; means to continuously maintain a film of liquid of torque transmitting thickness in the film space between the faces to transmit torque from the driven element to the other element during rotation of the elements, comprising a duct in one of the elements extending generally radially from the central opening thereof substantially closed at its radially outer end and having an opening longitudinally thereof open toward the face of the other rotatable element; liquid circulating pumping means and conduit means to conduct liquid from the pumping means to the central openings of the rotatable elements and thence to the duct and from the duct through the openings to radially intermediate portions of the faces; and means to subject the liquid of the film to axially directed pressure at the said radially intermediate portions tending to move the said portions apart axially, comprising an orifice for the opening formed to wedgingly force the oil into the film space, during relative rotation of the elements.

15. A power transmission comprising a pair of relatively rotatable and axially relatively movable elements each having a face surrounding its rotational axis, the faces being mutually confronting and parallel with a film space therebetween; a rotary power input to one of the elements to rotatively drive it; a rotary power output from the other element; a torque transmitting film of liquid in the film space between the two faces to transmit torque from the driven element to the other element; means to continuously maintain said film during rotation of the elements comprising a generally radial duct in one of the rotatable elements substantially closed at its radially outer end and having an opening longitudinally thereof open toward the face of the other rotatable element; means to continuously supply liquid to the duct at its radially inner end, and through the duct and out at the opening and into the film space; the opening at its orifice formed to force the oil into the film space with a wedging action, to subject the oil to axially directed pressure between the faces, tending to move them apart axially.

16. A power transmission comprising a pair of relatively rotatable and axially relatively movable elements each having a face surrounding its rotational axis, the faces being mutually confronting and parallel with a film space therebetween; a rotary power input to one of the elements to rotatively drive it; a rotary power output from the other element; a torque transmitting film of liquid in the film space between the two faces to transmit torque from the driven element to the other element; means to continuously maintain said film during rotation of the elements comprising a liquid conducting duct extending generally radially of one of the faces, means to continuously supply liquid to a radially inner portion of the duct to be propelled radially outward therein by centrifugal force, the duct being restricted at a radially outer portion and having an opening along its side, open toward the other face, and the duct supplying the liquid therein through the opening and to the film space at radially intermediate portions of the faces; and the wall of the duct at its opening formed to exert a wedging action on the liquid supplied to the film, to develop axially directed pressure in the film between the faces, tending to move them apart axially.

17. A power transmission comprising a pair of relatively rotatable and axially relatively movable elements each having a face surrounding its rotational axis, the faces being mutually confronting and parallel with a film space therebetween; a rotary power input to one of the elements to rotatively drive it; a rotary power output from the element; a torque transmitting film of liquid in the film space between the two faces to transmit torque from the driven element to the other element; means to continuously maintain said film during rotation of the elements comprising a liquid conducting duct extending generally radially of one of the faces, means to continuously supply liquid to a radially inner portion of the duct to be propelled radially outward therein by centrifugal force, the duct having a discharge opening extending longitudinally of the duct and open toward the other face and supplying the liquid therein to the film space at radially intermediate portions of the faces, the discharge opening of the duct having an orifice formed to cause the discharged liquids to be wedgingly forced between the faces to cause the film to be subjected to axially directed pressure at said radially intermediate portions, tending to move them apart axially.

18. A power transmission comprising a pair of relatively rotatable and axially relatively movable elements each having an annular face surrounding a central opening at its rotational axis, the faces being mutually confronting and parallel and with a film space therebetween; a rotary power input to one of the elements to rotatively drive it; a rotary power output from the other element; a torque transmitting film of liquid in the film space between the two faces to transmit torque from the driven element to the other element; means to continuously maintain the film during relative rotation of the elements comprising a duct extending generally radially of a rotatable element and opening into the film space, and means to supply liquid to the central opening and to the duct and to the film space at radially intermediate portions thereof; and means to subject the liquid of the film to axially directed pressure at the said radially intermediate portions, tending to move the said portions apart axially, comprising wedging surfaces at the duct opening wedgingly forcing the liquid into the film space during relative rotation of the rotatable elements; and operable means, operable to exert axially directed force in opposition to the film pressure and predominating thereover to move the rotatable elements closing together to decrease the film thickness and increase the transmitted torque, or optionally operable to allow the film pressure to move the rotatable elements farther apart to increase the film thickness and decrease the transmitted torque.

19. A power transmission comprising a pair of relatively rotatable and axially relatively movable elements each having a face surrounding its rotational axis, the faces being mutually confronting and parallel with a film space therebetween; a rotary power input to one of the elements to rotatively drive it; a rotary power output from the other element; a torque transmitting film of liquid in the film space between the two faces to transmit torque from the driven element to the other element; means to continuously maintain the film during relative rotation of the elements comprising a generally radial duct in one of the rotary elements open along its side toward the other element, means to supply liquid directly to a radially inner end of the duct and through the open side of the duct to radially intermediate portions of the faces; and means to subject the liquid of the film to axially directed pressure at the said radially intermediate portions, tending to move the said portions apart axially, comprising inclined surfaces at the opening of the duct formed to wedgingly force the liquid into the film space; and operable means, operable to exert axially directed force in opposition to the film pressure and predominating thereover to move the rotatable elements closer together to decrease the film thickness and increase the transmitted torque, or optionally operable to allow the film pressure to move the rotatable elements farther apart to increase the film thickness and decrease the transmitted torque.

20. A power transmission comprising a pair of relatively rotatable and axially relatively movable elements each having an annular face surrounding a central opening at its rotational axis, the faces being mutually confronting and parallel with a film space therebetween; a rotary power input to one element to rotatively drive it; a rotary power output from the other element; means to continuously maintain a film of liquid of torque transmitting thickness in the film space between the faces to transmit torque from the driven element to the other element during rotation of the elements, comprising a duct in one of the elements extending generally radially from the central opening thereof substantially closed at its radially outer end and having an opening longitudinally thereof open toward the face of the other rotatable element; liquid circulating pumping means and conduit means to conduct liquid from the pumping means to the central openings of the rotatable elements and thence to the duct and from the duct through the opening to radially intermediate portions of the faces; and means to subject the liquid of the film to axially directed pressure at the said radially intermediate portions, tending to move the said portions apart axially, comprising an orifice for the opening formed to wedgingly force the oil into the film space, during relative rotation of the elements; and operable means, operable to exert axially directed force in opposition to the film pressure and predominating thereover to move the rotatable elements closer together to decrease the film thickness and increase the transmitted torque, or optionally operable to allow the film pressure to move the rotatable elements farther apart to increase the film thickness and decrease the transmitted torque.

21. A power transmission comprising a pair of relatively rotatable and axially relatively movable elements each having a face surrounding its rotational axis, the faces being mutually confronting and parallel with a film space therebetween; a rotary power input to one of the elements to rotatively drive it; a rotary power output from the other element; a torque transmitting film of liquid in the film space between the two faces to transmit torque from the driven element to the other element; means to continuously maintain said film during rotation of the elements comprising a generally radial duct in one of the rotatable elements substantially closed at its radially outer end and having an opening longitudinally thereof open toward the face of the other rotatable element; means to continuously supply liquid to the duct at its radially inner end, and through the duct and out at the opening and into the film space; the opening at its orifice formed to force the oil into the film space with a wedging action, to subject the oil to axially directed pressure between the faces, tending to move them apart axially; and operable means, operable to exert axially directed force in opposition to the film pressure and predominating thereover to move the rotatable elements closer together to decrease the film thickness and increase the transmitted torque, or optionally operable to allow the film pressure to move the rotatable elements farther apart to increase the film thickness and decrease the transmitted torque.

22. A power transmission comprising a pair of relatively movable elements each having a face surrounding its rotational axis, the faces being mutually confronting and parallel with a film space therebetween; a rotary power input to one of the elements to rotatively drive it; a rotary power output from the other element; a torque transmitting film of liquid in the film space between the two faces to transmit torque from the driven element to the other element; means to continuously maintain said film during rotation of the elements comprising a liquid conducting duct extending generally radially of one of the faces, means to continuously supply liquid to a radially inner portion of the duct to be propelled radially outward therein by centrifugal force, the duct being restricted at a radially outer portion and having an opening along its side, open toward the other face, and the duct supplying the liquid therein through the opening and to the film space at radially intermediate portions of the faces; and the wall of the duct as its opening formed to exert a smooth wedging action on the liquid supplied to the film, to develop axially directed pressure in the film between the faces, tending to move them apart axially; and operable means, operable to exert axially directed force in opposition to the film pressure and predominating thereover to move the rotatable elements closer together to decrease the film thickness and increase the transmitted torque, or optionally operable to allow the film pressure to move the rotatable elements farther apart to increase the film thickness and decrease the transmitted torque.

23. A power transmission comprising a pair of relatively rotatable and axially relatively movable elements each having a face surrounding its rotational axis, the faces being mutually confronting and parallel with a film space therebetween; a rotary power input to one of the elements to rotatively drive it; a rotary power output from the element; a torque transmitting film of liquid in the film space between the two faces to transmit torque from the driven element to the other element; means to continuously maintain said film during rotation of the elements comprising a liquid conducting duct extending generally radially of one of the faces, means to continuously supply liquid to a radially inner portion of the duct to be propelled radially outward therein by centrifugal force, the duct having a discharge opening extending longitudinally of the duct and open toward the other face and supplying the liquid therein to the film space at radially intermediate portions of the faces, and the discharge opening of the duct having an orifice formed to cause the discharged liquid to be wedgingly smoothly forced between the faces to cause the film to be subjected to axially directed pressure at said radially intermediate portions, tending to move them apart axially; and operable means, operable to exert axially directed force in opposition to the film pressure and predominating thereover to move the rotatable elements closer together to decrease the film thickness and increase the transmitted torque, or optionally operable to allow the film pressure to move the rotatable elements farther apart to increase the film thickness and decrease the transmitted torque.

LEV A. TROFIMOV.

REFERENCES CITED

The following references are of record in the file of this patent:

UNITED STATES PATENTS

| Number | Name | Date |
|---|---|---|
| 923,565 | Newcomb | June 1, 1909 |
| 1,414,622 | Carter | May 2, 1922 |
| 1,862,802 | Pope | June 14, 1932 |
| 2,079,724 | Van Ranst | May 11, 1937 |
| 2,144,596 | Daiber | Jan. 17, 1939 |
| 2,151,075 | Berger | Mar. 21, 1939 |
| 2,313,132 | Elliott | Mar. 9, 1943 |
| 2,361,385 | Day | Oct. 31, 1944 |
| 2,405,135 | Butzback | Aug. 6, 1946 |

FOREIGN PATENTS

| Number | Country | Date |
|---|---|---|
| 429,837 | Germany | June 3, 1926 |
| 629,716 | Germany | May 12, 1936 |
| 776,210 | France | Oct. 31, 1934 |